July 11, 1950      L. P. SINZ      2,514,458
PRESSURE REGULATOR
Filed Jan. 22, 1946      2 Sheets-Sheet 2
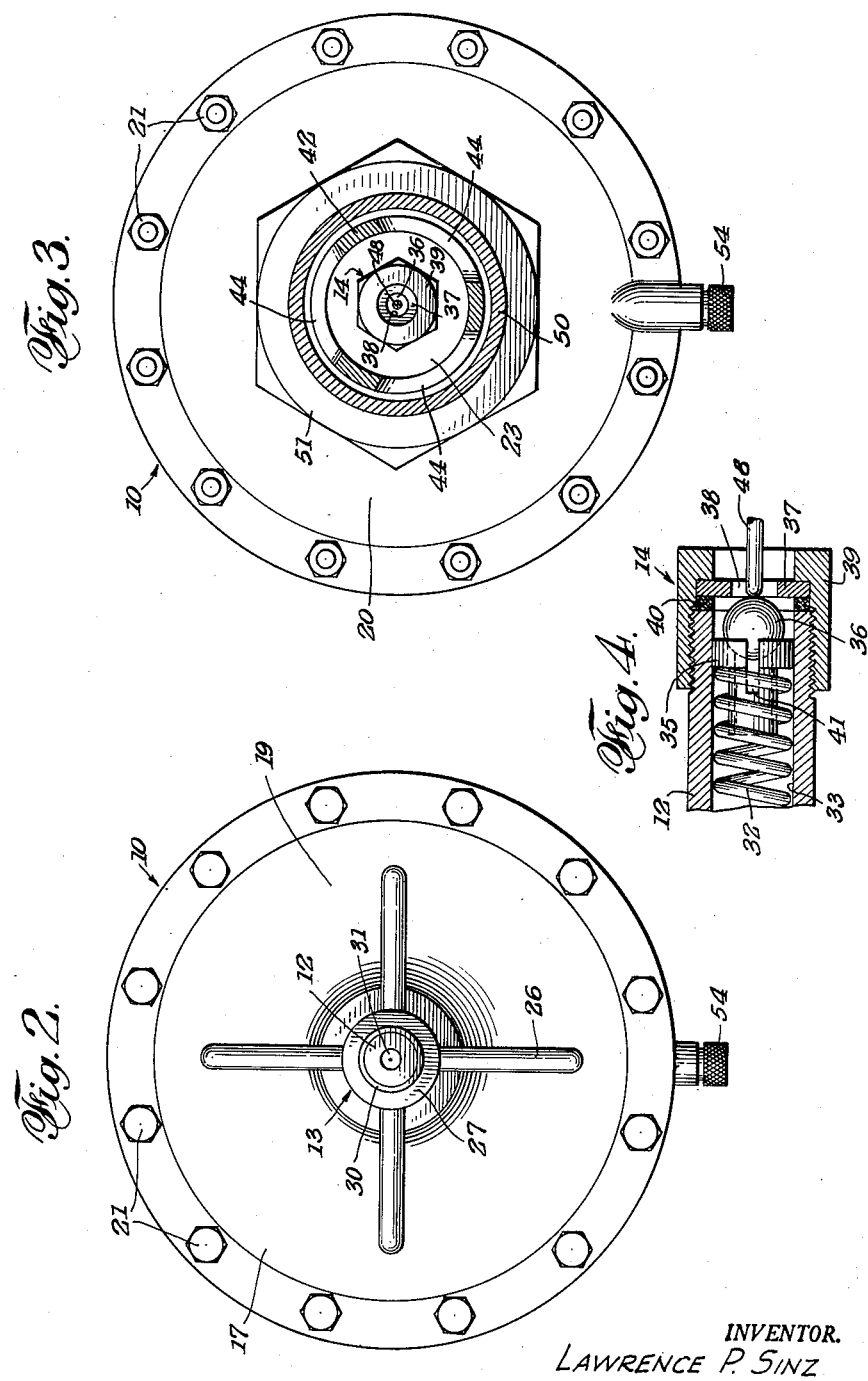
INVENTOR.
LAWRENCE P. SINZ
BY
ATTORNEYS Patented July 11, 1950

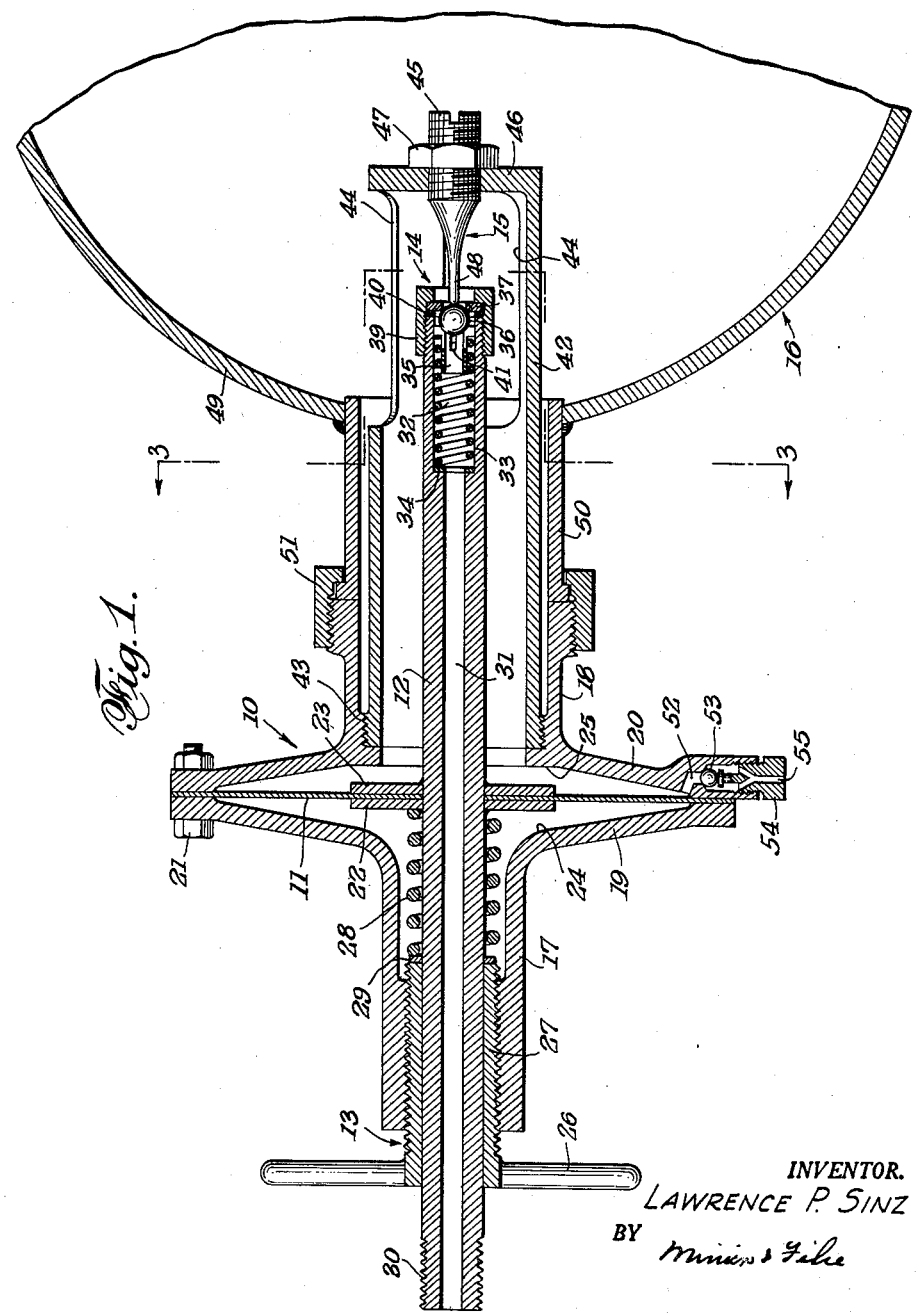

2,514,458

UNITED STATES PATENT OFFICE 2,514,458

PRESSURE REGULATOR

Lawrence P. Sinz, Los Angeles, Calif.

Application January 22, 1946, Serial No. 642,593

3 Claims. (Cl. 50—23)

This invention relates to pressure regulators and deals more particularly with a pressure reducing valve suitable for use in handling fluids or gases.

The primary object of the present invention is to provide an improved pressure regulator which is simple in construction, leak-proof and easily regulated for obtaining a desired differential of pressure between the high and low pressure sides of the regulator.

Another object of the invention is to provide a fluid or gas pressure regulator of novel design which is particularly adapted to handle carbonic gases or liquid carbon dioxide without prior heating thereof and yet obviating freezing of the parts by formation of ice due to expansion of the carbonic fluid into a low pressure area.

Another object of the invetnion is to provide a fluid pressure valve which embodies a variably loaded diaphragm affording the differential of pressures from the high and low pressure sides of the regulator.

Another object of the invention is to provide a fluid pressure regulator, the design of which affords use of the regulator in any position, the elements of the regulator being adapted to function properly independently of the position of the regulator.

Another object of the invention is to provide a fluid pressure regulator embodying an improved valve structure and arrangement whereby effective sealing is obtained when the regulator is balanced by the high and low pressure and which suitably opens, upon a drop in the low pressure, to re-establish the balance of the regulator as determined by the manual setting thereof.

The foregoing and other objects of the invention will become clear as the following description of the invention progresses. The accompanying drawings, which illustrate a preferred embodiment of the invention, are used as the basis for the description which is intended as by way of illustration or example only.

In the drawings:

Figure 1 is a longitudinal sectional view of a fluid pressure reguator according to the present invention.

Figure 2 is an end view thereof.

Figure 3 is a cross sectional view as taken on the line 3—3 of Figure 1.

Figure 4 is an enlarged fragmentary detail sectional view of a valve structure employed in the invention.

As shown in the drawings:

That embodiment of the pressure regulator of the invention which is illustrated comprises, generally, a body 10, a transversely disposed diaphragm 11 carried by the body, a longitudinally movable hollow stem 12 mounted centrally of the diaphragm to move therewith and adapted to receive fluid under relatively high pressure, adjusting means 13 for varying the loading on the diaphragm according to the degree of low pressure desired, valve means 14 carried by the stem and controlling the flow of high pressure fluid from the stem, adjustable means 15 effective to control the opening of the valve means 14, and a low pressure receiver 16 on the outlet side of the valve means 14.

The body 10 comprises longitudinally arranged castings 17 and 18 having respective cooperating flanges 19 and 20 for clamping the diaphragm 11 between them as by means of peripheral bolts 21.

The stem 12 passes longitudinally through the body 10 and, as shown, the stem and diaphragm 11 are rigidly connected by discs 22 and 23 on either side of the diaphragm and soldered, threaded, brazed or welded to the stem. The castings 17 and 18 are so designed as to afford abutments 24 and 25 respectively engageable with the discs 22 and 23 to limit the movement of the diaphragm and thereby obviate undue distortion thereof.

The means 13 for adjusting the loading on the diaphragm 11 comprises a handle 26, a threaded hollow collar 27, threadedly engaged with the body casting 17 and a coil spring 28 about the stem 12 and confined between the disc 22 and a thrust washer 29 at the end of the collar 27. By rotating the handle 26 varying end pressure is applied to the spring 28 and transmitted thereby to the diaphragm 11.

The stem 12 is provided with a threaded outer end 30 for connection to a high pressure source, the fluid from which may enter and fill the passage 31 extending longitudinally of the stem. The end of said stem which carries the valve means 14 is designed to extend into the low pressure receiver 16.

The valve means 14 comprises a coil spring 32 arranged in a counterbore 33 in the stem to provide an abutment 34 for one end of the spring 32, a follower 35 at the other end of the spring, a check valve ball 36 engaged by the follower 35 to be centered thereby in the counterbore 33, and a valve seat 37 having a passage 38. A cap 39 is threadedly connected with the stem 12 to clamp the valve seat 37 in place and a washer 40 between said valve seat and the associated end of the stem, seals against pressure leakage through the mentioned threaded connection. The follower 35 may be variously made. As shown, slots 41 are provided through which fluid may pass from the passage 31 through the passage 38 when the valve ball 36 is unseated.

The means 15 is carried by a cage 42 concentrically arranged with the stem 12 and carried by the casting 18 as by a threaded connection 43. The cage 42 is provided with parts 44 for passing fluid from the valve-controlled passage 31 into the low pressure receiver 16. The means 15 comprises a stud 45 threaded in the end 46 of the cage 42, a lock nut 47 for the stud, and a flared or conical end 48 on the stud and adapted to engage the valve ball 36.

The low pressure receiver 16, of course, may be designed in accordance with its use and the type of fluid handled thereby. As shown, the receiver comprises a tank 49 provided with a nipple 50, into which the regulator extends and which is connected to the regulator body as by a union 51.

In operation, assuming no pressure in the receiver 16, upon connection of the stem to a high pressure source, high pressure fluid will pass through passage 31 to impinge on the valve seat 37. Since the valve ball 36 is held against movement by the end 48 of the stud 45, said fluid pressure will cause endwise or longitudinal movement of the stem 12 as shown in Figure 4, and the fluid will enter the receiver through the valve passage 38 and the cage ports 44. As the pressure builds up in the receiver, it will manifest itself on the diaphragm 11 which has a much larger pressure effective area than that of the valve seat 37 to move, and press the valve seat 37 against the valve ball as in Figure 1. This closing of the valve means 14 will occur at a lower pressure in the receiver 16 than that in the stem 12, the relationship being proportional to the effective areas of the valve seat 37 and the diaphragm 11. The means 13 is effective to vary the degree of pressure necessary to close the valve means 14. By manually varying the loading on the non-pressure side of the diaphragm by means of the handle 26, a desired low pressure may be obtained in the receiver which is maintained by automatic operation of the valve means 14 as the low pressure falls below a defined minimum. The tension of the springs 28 and 32 is such that desired balance is accomplished.

As before pointed out, the regulator may be used in any position with equally effective results. When used horizontally, as shown, and with certain condensing gases, a drain may be provided for the area about the diaphragm. The drain shown comprises a port 52 in said area, a ball check 53 controlling the port, and locking plug 54 for holding the ball check to close said port and adapted to be backed off so that the area may drain through the port and through a passage 55 in the plug 54.

It will be evident that the described embodiment of the invention may be varied within the general broad concepts of the invention. I, therefore, do not desire to restrict myself to the regulator shown and described but desire to include such modifications thereof that may fall within the spirit and scope of the invention as defined by the appended claims.

I claim:

1. In a fluid pressure regulator, a hollow high pressure fluid receiving stem, a valve assembly at the end of said stem including a valve member, a seat therefor controlling flow through the stem, a member engaged with the valve member, a diaphragm connected to the stem adapted to receive fluid under pressure passing between the valve member and its seat and to move the stem and the valve seat relatively to the valve member upon varying of the pressures on the diaphragm and the valve seat, manual control means for applying a regulating loading on the diaphragm, and a compressible member adapted to be variably tensioned by said control.

2. A fluid pressure regulator comprising a hollow body, a diaphragm arranged transversely in the hollow of the body, a stem having a high pressure fluid passage arranged longitudinally in the body and connected to the diaphragm, a valve structure including a valve member carried by the stem for controlling flow of high pressure fluid through the stem to act on the diaphragm, a cage carried by the body and having ports, and a member carried by the cage and engaged by the valve member to hold the latter against movement upon endwise movement of the stem as controlled by flexure of the diaphragm.

3. A fluid pressure regulator comprising a hollow body, a diaphragm arranged transversely in the hollow of the body, means for variably loading the diaphragm, a stem having a high pressure fluid passage arranged longitudinally in the body and connected to the diaphragm, a valve structure including a valve member carried by the stem for controlling flow of high pressure fluid through the stem to act on the diaphragm, a cage carried by the body and having ports, and a member carried by the cage and engaged by the valve member to hold the latter against movement upon endwise movement of the stem as controlled by flexure of the diaphragm.

LAWRENCE P. SINZ.

REFERENCES CITED

The following references are of record in the file of this patent:

UNITED STATES PATENTS

| Number | Name | Date |
|---|---|---|
| 1,229,860 | Ashelman | June 12, 1917 |
| 1,636,561 | Hazard | July 19, 1927 |
| 2,215,597 | Semon | Sept. 24, 1940 |

FOREIGN PATENTS

| Number | Country | Date |
|---|---|---|
| 598,083 | France | Sept. 16, 1925 |